(12) United States Patent
Geyer, III

(10) Patent No.: US 7,608,124 B2
(45) Date of Patent: Oct. 27, 2009

(54) PARTICULATE FILTRATION SYSTEM

(76) Inventor: Robert E. Geyer, III, 1145 Birch Dr., Schererville, IN (US) 46375

( * ) Notice: Subject to any disclaimer, the term of this patent is extended or adjusted under 35 U.S.C. 154(b) by 521 days.

(21) Appl. No.: 11/426,989

(22) Filed: Jun. 28, 2006

(65) Prior Publication Data

US 2006/0288676 A1 Dec. 28, 2006

Related U.S. Application Data

(60) Provisional application No. 60/694,350, filed on Jun. 28, 2005.

(51) Int. Cl.
*B01D 46/00* (2006.01)

(52) U.S. Cl. ............... 55/498; 55/529; 55/410; 55/418

(58) Field of Classification Search ............ 210/493.5, 210/440, 443, 444, 493.1, 493.2, 497.3; 55/385.3, 55/498, 521, 320, 482, 529, 410, 418
See application file for complete search history.

(56) References Cited

U.S. PATENT DOCUMENTS

| | | | |
|---|---|---|---|
| 2,952,327 A | 9/1960 | Farr | |
| 4,065,276 A | 12/1977 | Nakaya et al. | |
| 4,135,899 A | 1/1979 | Gauer | |
| 4,157,902 A | 6/1979 | Tokar | |
| 4,261,710 A | 4/1981 | Sullivan | |
| 4,365,980 A | 12/1982 | Culbert et al. | |
| 4,397,268 A | 8/1983 | Brown | |
| 4,764,191 A | 8/1988 | Morelli | |
| 5,106,397 A | 4/1992 | Jaroszczyk et al. | |
| 5,320,657 A | 6/1994 | Adams | |
| 5,458,666 A | 10/1995 | Miyakata | |
| 5,549,722 A | 8/1996 | Zemaitis et al. | |
| 5,549,724 A | 8/1996 | Mochida | |
| 5,685,887 A | 11/1997 | Mochida | |
| 6,319,298 B1 | 11/2001 | Ng-Gee-Quan | |
| 6,383,244 B1 | 5/2002 | Wake et al. | |
| 6,391,076 B1 | 5/2002 | Jaroszczyk et al. | |
| 6,585,887 B2 * | 7/2003 | Michels et al. | .............. 210/130 |
| 6,638,330 B1 | 10/2003 | Bergami | |
| 6,808,552 B2 | 10/2004 | Borla | |
| 6,833,023 B1 | 12/2004 | Vandenberghe et al. | |
| 2003/0089233 A1 * | 5/2003 | Borla | .......................... 95/273 |

* cited by examiner

*Primary Examiner*—Duane Smith
*Assistant Examiner*—Christopher P Jones
(74) *Attorney, Agent, or Firm*—Hartman & Hartman, P.C.; Gary M. Hartman; Domenica N. S. Hartman

(57) ABSTRACT

A particulate filtration system including a frustoconical-shaped filtration element, a housing enclosing the filtration element and coaxial therewith, an inlet, and an outlet. The filtration element has a closed first end and a larger oppositely-disposed open second end. The housing has a first closed end, a larger oppositely-disposed open second end, and a frustoconical-shaped wall therebetween and surrounding the filtration element. An annular-shaped passage is defined by and between the filtration element and the housing. The inlet is located at the second end of the housing and is fluidically connected to the annular-shaped passage. The outlet is located at the second end of the filtration element and coaxial with the inlet. The outlet defines an outlet passage with a frustoconical or arcuate shape and a cross-sectional area that decreases along the flow path in a direction away from the filtration element.

20 Claims, 7 Drawing Sheets

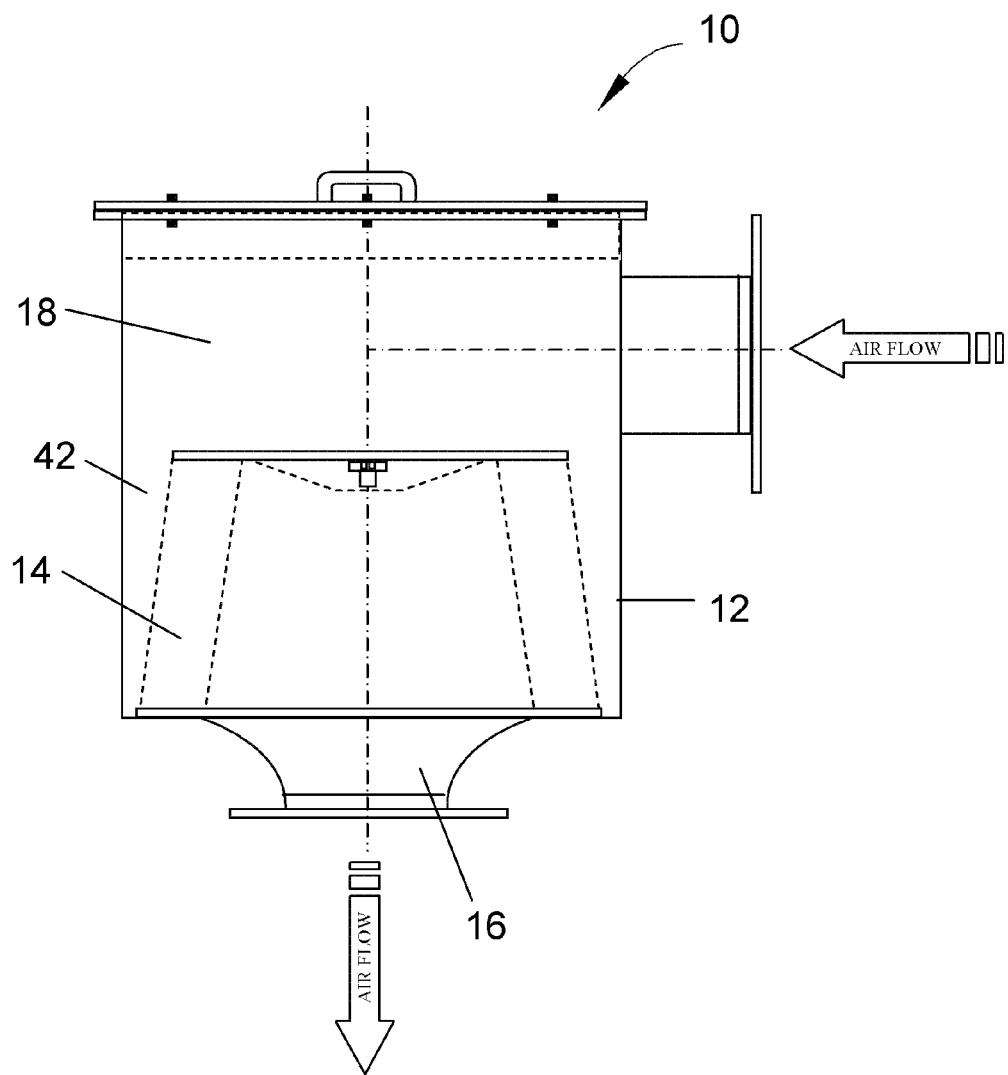

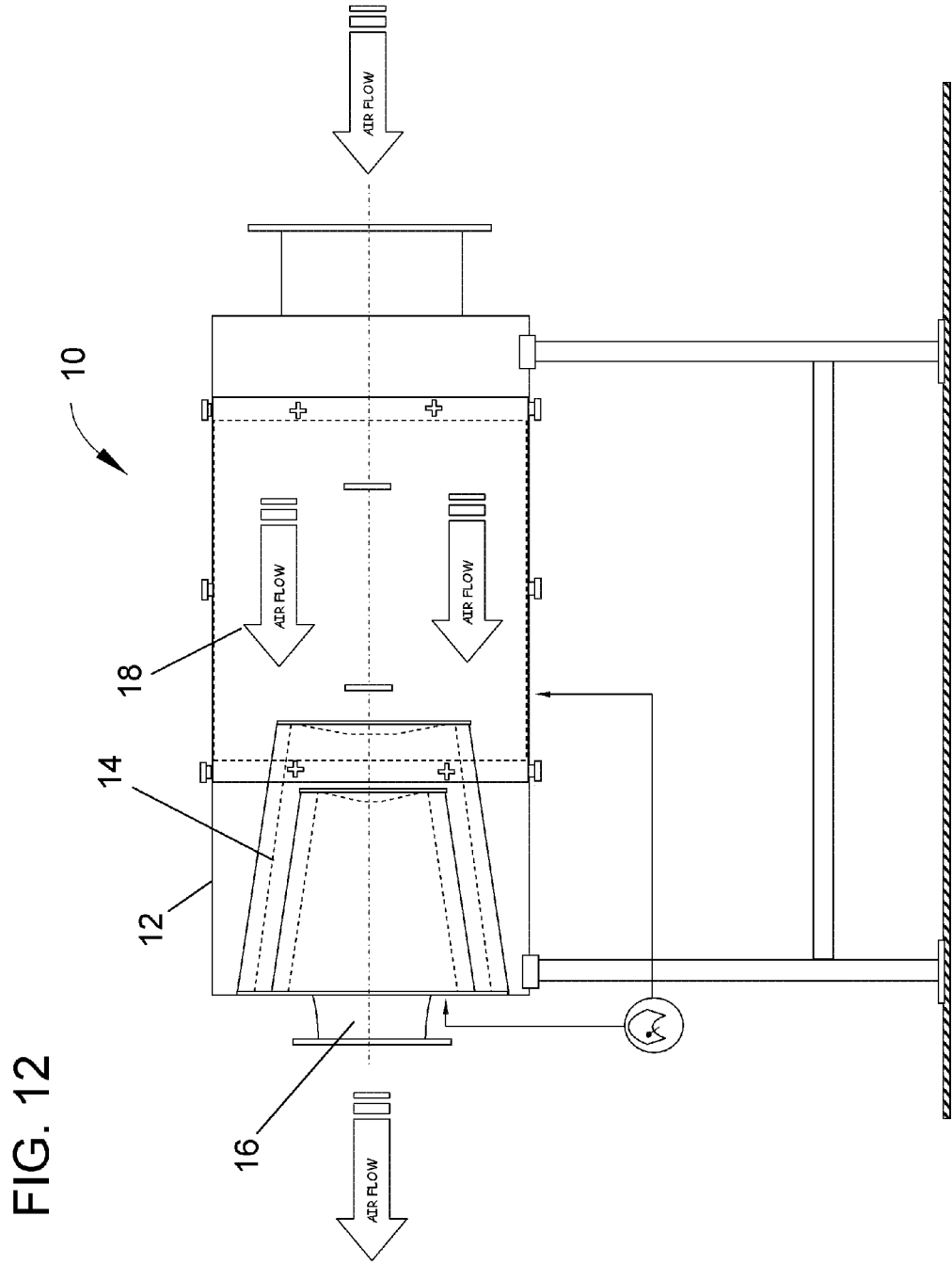

PARTICULATE FILTRATION SYSTEM

CROSS REFERENCE TO RELATED APPLICATIONS

This application claims the benefit of U.S. Provisional Application No. 60/694,350, filed Jun. 28, 2005, the contents of which are incorporated herein by reference.

BACKGROUND OF THE INVENTION

The present invention generally relates to the removal of particulate matter from air or another gas or gas mixture, and more particularly to a particulate filtration system capable of exhibiting improved performance.

A wide variety of air/gas filtration systems are commercially available. One such system manufactured by Endustra Filter Manufacturers is referred to as the "Venturi Outlet Design," and makes use of a cylindrical filter element, a cylindrical weather hood that protectively surrounds the filter element, and an outlet pipe with a frustoconical, arcuate, or funnel-shaped outlet passage. The "Venturi Outlet Design" helps reduce the pressure drop across the outlet pipe by straightening or otherwise gradually transitioning the gas flow from the low-pressure inlet side, through the filter element, and out the high-pressure outlet side of a filter. The outlet pipe is a one-piece unit that includes a seal plate with a sealing lip for sealing with the filter element, and is capable of reducing initial pressure drop through the system by about 20 to 30%.

More typical filtration systems utilize a cylindrical filter element, hood, and outlet comprising a flat seal plate and outlet pipe. The gas path through such systems makes a series of hard right turns to enter the filter element, and is subsequently quickly compressed through an outlet orifice to exit the system. Such flow paths form vortexes, areas of static, resistance, and pressure drop across the outlet orifice that are detrimental to the performance of the system.

BRIEF SUMMARY OF THE INVENTION

The present invention provides a particulate filtration system for filtering particulate matter from air or another gas or gas mixture. The filtration system is configured to contour the flow of gases through the system, decreasing and increasing the flow velocity in a manner that controls static pressures, laminates intake air flow, and reduces vortexes, resistance, and pressure drops across the outlet of the system and across a filter media within the system.

The particulate filtration system generally includes a filtration unit having a flow path therethrough. The filtration unit includes a frustoconical-shaped filtration element, a housing enclosing the filtration element and coaxial therewith, an inlet, and an outlet. The filtration element has a first end, an oppositely-disposed second end larger than the first end, an opening in the second end, means for sealing the first end, a frustoconical-shaped exterior surface, a frustoconical-shaped interior surface radially inward from the exterior surface, and a frustoconical-shaped interior cavity between the first and second ends and surrounded by the interior surface. The housing has a first end, an oppositely-disposed second end larger than the first end, a frustoconical-shaped wall between the first and second ends of the housing, surrounding the filtration element, and having a frustoconical-shaped interior surface radially outward from the frustoconical-shaped exterior surface of the filtration element, an opening in the second end of the housing, and means for sealing the first end of the housing. An annular-shaped passage is defined by and between the exterior surface of the filtration element and the interior surface of the housing. The inlet is located at the second end of the housing and is fluidically connected to the annular-shaped passage. The outlet is located at the second end of the filtration element, coaxial with the inlet, and fluidically connected to the interior cavity of the filtration element. The outlet defines an outlet passage with a frustoconical or arcuate shape and a cross-sectional area that decreases along the flow path in a direction away from the filtration element. The inlet, the annular-shaped passage, the filtration element, the interior cavity of the filtration element, and the outlet passage define the flow path through the filtration unit, and are sized and shaped relative to each other to contour flow through the filtration system by decreasing flow velocity through the filtration element so as to reduce face velocity and reduce differential pressure across the filtration element, and by increasing flow velocity at the outlet to reduce pressure.

Various embodiments fall within the scope of the system described above. For example, the element and housing can be arranged so that their frustoconical shapes are parallel so that the annular-shaped passage has a substantially uniform width. With such an arrangement, the outlet is surrounded by the inlet, and the flow direction of air/gas through the outlet and inlet is in opposite directions. In another embodiment, the element and housing can be arranged so that their frustoconical-shaped walls are not parallel and the width of annular-shaped passage decreases in the direction of gas flow through the passage. With such an arrangement, the flow of air/gas through the filter unit is generally unidirectional. According to the invention, by forming the outlet passage, element, and housing to have cooperating frustoconical and/or arcuate shapes, the benefits of the invention can be obtained with a variety of filter system configurations.

Other objects and advantages of this invention will be better appreciated from the following detailed description.

BRIEF DESCRIPTION OF THE DRAWINGS

FIG. 11 is a cross-sectional representation of an inline particulate filtration system have a ninety-degree turn flow pattern therethrough in accordance with a third embodiment of this invention.

FIG. 12 is a cross-sectional representation of an inline particulate filtration system have a substantially straight flow pattern therethrough in accordance with a fourth embodiment of this invention.

DETAILED DESCRIPTION OF THE INVENTION

FIGS. 1 through 12 depict various embodiments of particulate filtration units in accordance with the invention. While the invention will be described in reference to air filtration, the invention can be employed to filter a wide variety of gases for various applications. As such, the term "air" will typically be used in reference to ambient atmospheric air, though the principles of this invention and the units themselves apply to essentially any gas over wide ranges of pressures and temperatures.

Figure 1:
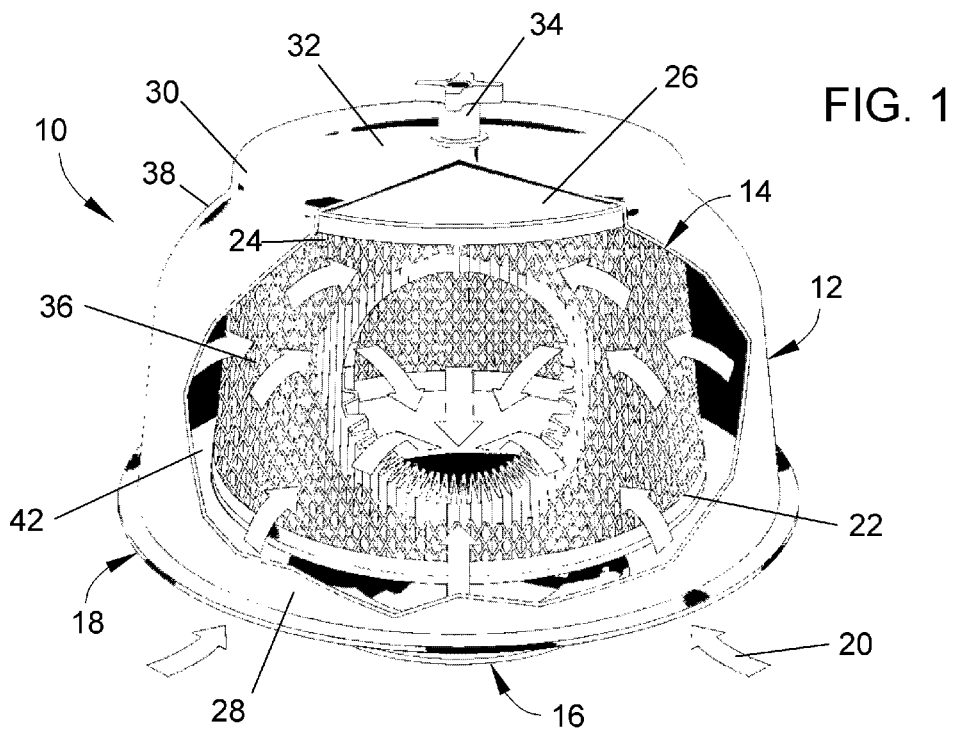
FIG. 1 is a perspective view of a particulate filtration unit in accordance with a first embodiment of this invention, with the interior of the unit partially exposed to reveal a filtration element and a reversing flow path therethrough.
Figure 2:
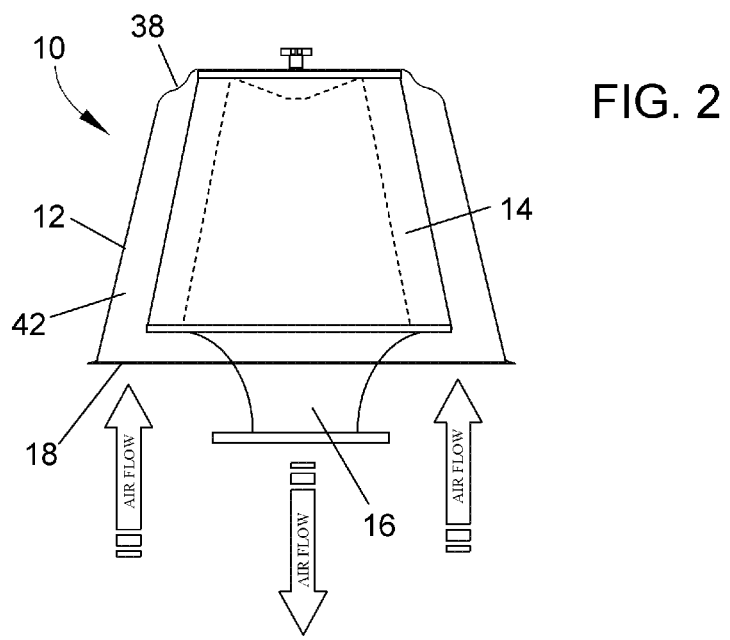
FIGS. 2 and 3 are cross-sectional representations of two alternative configurations for the filtration unit of FIG. 1.
Figure 3:
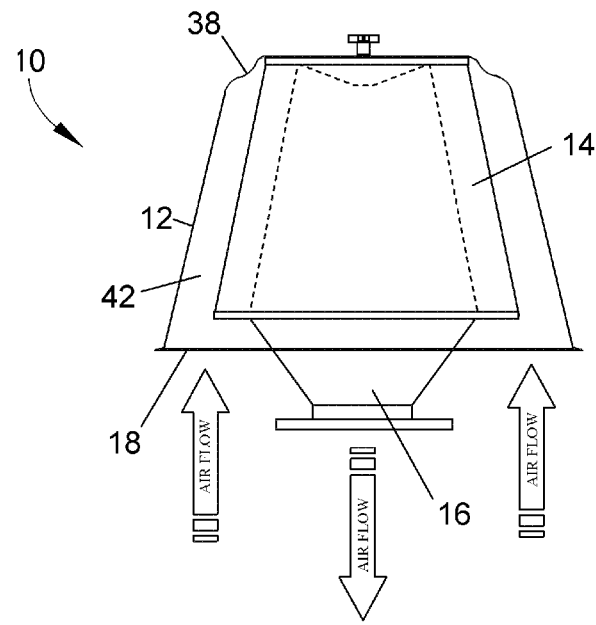

With reference to FIGS. 1 through 3, a filtration unit 10 is shown as comprising a filter element 14 within a weather hood (lid) 12 that surrounds and encloses the element 14, an outlet pipe 16 that defines an outlet of the filtration unit 10 located at an open end 22 of the element 14, and an annular-shaped inlet 18 that defines an inlet of the filtration unit 10 and is defined by and between the hood 12 and the outlet pipe 16. As will be discussed below, the filtration unit 10 and its components are configured and sized relative to each other to make use of aerodynamic and hydraulic principles to contour the flow path 20 through the filtration unit 10 by decreasing flow velocity through the filter element 14 so as to reduce face velocity and reduce differential pressure across the element 14, and by increasing flow velocity at the outlet pipe 16 to reduce pressure immediately upstream of a system on which the unit 10 is installed. The unit 10 achieves this capability through the use of frustoconical, arcuate, and/or funnel-shaped contours to straighten or more gradually transition the flow path 20 within the unit 10, reduce vortexes, static, resistance, and pressure drops across the orifice of the outlet pipe 16, and also reduce vortexes, static, resistance, and pressure drops within the filter element 14.

As evident from FIGS. 1 through 3, the element 14 generally has a frustoconical shape such that the end 22 has a larger diameter than the opposite end 24 of the element 14, with a uniform taper therebetween. Whereas the larger end 22 is open and fluidically connected to the outlet pipe 16, preferably as a result of the larger end 22 abutting the outlet pipe 16 and sealed with, for example, a gasket, the smaller end 24 is closed by a gas-impermeable end wall 26 formed of a suitable material and bonded or otherwise attached to the end 24 of the element 14. The hood 12 is also configured to have a larger end 28 and an oppositely-disposed smaller end 30. The hood 12 is contoured to transition the flow path 20 into the filter element 14, and for this purpose the hood 12 has an arcuate shape with a frustoconical wall portion between its ends 28 and 30. In particular, the larger end 28 of the hood 12 has an arcuate transition region between the inlet 18 and the frustoconical wall portion, and the smaller end 30 of the hood 12 has an arcuate transition region that includes an arcuate shoulder 38 between the frustoconical wall portion and an end wall 32 of the hood 12. In FIGS. 1 through 3, the smaller ends 24 and 30 of the element 14 and hood 12 are adjacent each other, as are the larger ends 22 and 28 of the element 14 and hood 12. The end wall 26 of the element 14 is secured to the end wall 32 of the hood 12 with a threaded fastener 34, though various other techniques could be used to secure the element 14 to the hood 12.

The hood 12 is depicted in the Figures as having a unitary construction of, for example, a carbon steel, though various other constructions are possible. The hood 12 coaxially positions and orients the element 14 within its interior in a manner that encloses and protects the element 14 while also promoting the aerodynamic flow of air through the hood 12 and element 14, including an outside-to-inside flow path through the element 14, while also simplifying the procedure for replacing the element 14. As understood in the art, the hood 12 is sized to accommodate the gas flow for a given duct size.

The filter element 14 is preferably a disposable unit that includes a pleated filtration membrane 36 between its opposite ends 22 and 24. In view of the shape of the element 14, the membrane 36 defines frustoconical-shaped interior and exterior surfaces, and the interior surface of the membrane 36 defines a frustoconical-shaped interior between the ends 22 and 24 of the element 14. The material for the membrane 36 can be essentially any air-permeable synthetic or natural materials that exhibit the required filtration efficiencies, flame resistance, recoverability, and other requirements known in the art, such as operating temperature as defined by the specific application. The membrane 36 is preferably pleated to have a pleat depth and spacing optimized for airflow capacity and filtrate loading as dictated by the specific application requirements.

The opposing surfaces of the hood 12 and element 14 are generally parallel, defining an annular-shaped flow passage 42 therebetween that, though defined by a substantially constant distance between the hood 12 and element 14, gradually decreases in cross-sectional area. The cross-sectional area of the inlet 18 is less than the outer frustoconical surface area of the filter element 14, with the result that face velocity and differential pressure across the element 14 are reduced. However, the cross-sectional area of the inlet 18 to the unit 10 is larger than the open end 22 of the filter element 14, with the result that flow velocity increases between the unit inlet 18 and the open end 22 of the filter element 14, between which the air passes through the element 14. In addition, the cross-sectional area of the passage within the outlet pipe 16 is smaller than the open end 22 of the filter element 14, with the result that flow velocity further increases as the air passes through the outlet pipe 16.

As shown in FIG. 1, the flow path 20 within the unit 10 transitions from an essentially axial flow through the annular-shaped inlet 18 surrounding the outlet pipe 16, to a radially inward flow through the element 14, and then from the interior of the element 14 to an axial flow through the outlet pipe 16 in an opposite direction to the flow through the inlet 18. The hood 12 is formed to aid airflow and reduce restriction in key areas where air is usually most restricted in conventional air filtration systems, namely, the ends 28 and 30 of the hood 12 at the inlet 18 and end wall 32. For example, instead of a sharp, 90-degree at the smaller end 30 of the hood 12, as in conventional filter hoods, where the gas has the opportunity to be restricted either via vortex or constraint, the arcuate shoulder 38 both directs and smooths the transition of flow through the filter element 14. This benefit becomes increasingly important as the filter element 14 becomes loaded with contaminant and restriction otherwise increases throughout the system. The shoulder 38 increases the static pressure outside the filter element 14, and the increased static pressure immediately upstream of the filter element 14 effect helps to cancel the differential pressure measured downstream of the filter element 14.

As more fully shown in FIGS. 2 and 3, the outlet pipe 16 preferably has a frustoconical and/or arcuate cross-sectional shape that increases the velocity of the airflow as it passes through the outlet pipe 16. In FIG. 2, the outlet pipe 16 has an arcuate shape with a substantially constant radius of curvature, whereas the outlet pipe 16 of FIG. 3 has an essentially frustoconical shape. Preference for a more frustoconical or arcuate shape will depend in part on the ratio of the difference between the size of the filter element 14 (stipulated by volumetric airflow requirements) and the size of the outlet pipe 16 (stipulated by the inlet to the machine or air system with which the unit 10 is used). Used in combination with the frustoconical hood 12 and filter element 14, the outlet pipe 16 is capable of reducing power consumption by about 30 to 50% over existing commercial filtration units.

In view of the above, it can be appreciated that the transitions defined by and between the hood 12, filter element 14, and outlet pipe 16 of the filtration units 10 shown in FIGS. 1, 2, and 3 serve to minimize the flow resistance within the units 10, for example, by as much as about 30 to 50% as compared to existing filtration units commercially available. In practice, the shape of the hood 12 shown in FIGS. 1 through 3 has been shown to enable the size of the hood 12 to be minimized yet not measurably restrict flow to the filter element 14, whereas in the prior art it is commonly understood that a weather hood will add a measure of restriction to a filter unit. Reductions in pressure loss are advantageous in terms of increasing filter element life and allowing for the use of a more efficient filter element 14 capable of improved filtration. As a result, the unit 10 is capable of being lighter in weight and handling greater volumes of air than commercial units previously available.

Figure 4:
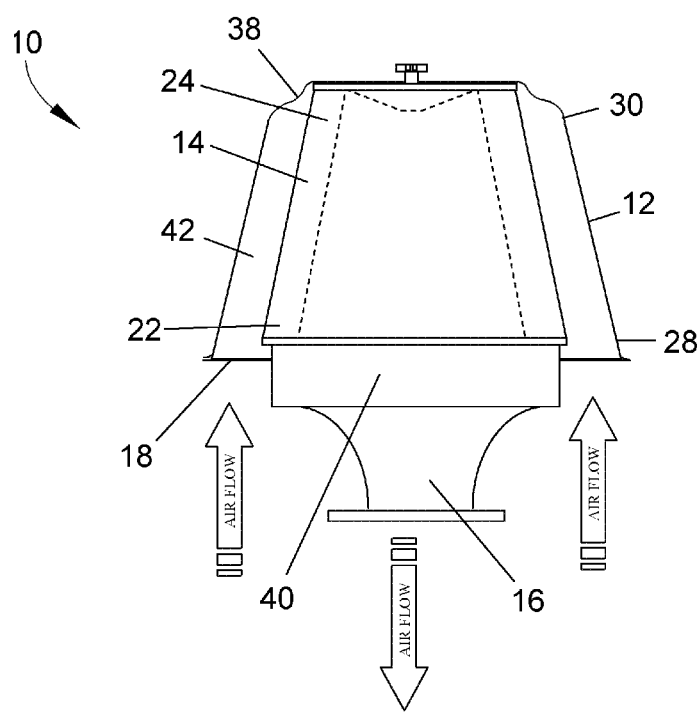
FIG. 4 is a cross-sectional representation of a filtration unit similar to the filtration unit of FIG. 1, but modified to include a silencer section.

FIGS. 4 through 12 depict additional features and configurations for filtration units in accordance with this invention. In these Figures, consistent reference numbers are used to identify functionally similar structures. In FIG. 4, a filtration unit 10 is shown configured as a filter silencer. In particular, the unit 10 includes a silencing chamber 40 that enables the unit 10 to achieve noise attenuation, effectively "silencing" the filter 10 within a given acoustical range. The silencing chamber 40 can be sized and configured in accordance with known practices, but when used in combination with the hood 12, filter element 14, and outlet pipe 16 of this invention, additional noise attenuations of about 5 to 10 dB have been achieved. Such an improvement is significant, in that similar levels of noise attenuation with prior art filter units have typically been achieved with dedicated snubber silencers or acoustical tubes that greatly increase initial restriction or pressure loss. As such, the present invention has the capability of making acoustical tubes unnecessary, and in some cases reduces the need for any noise attenuation in addition to that provided by the silencing chamber 40.

Figure 5:
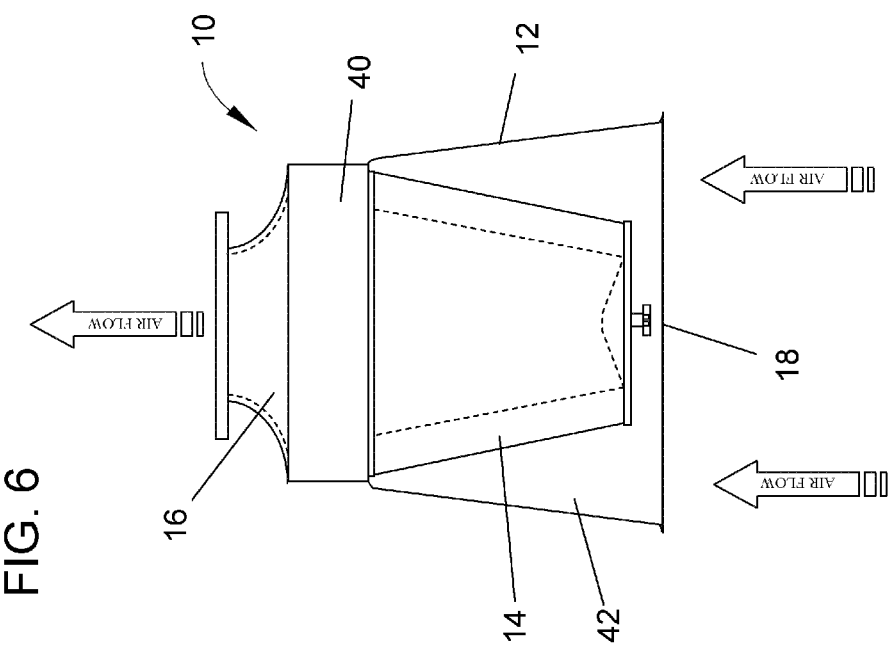
FIG. 5 is a cross-sectional representation of a particulate filtration unit have a non-reversing flow path therethrough in accordance with a second embodiment of this invention.
Figure 6:
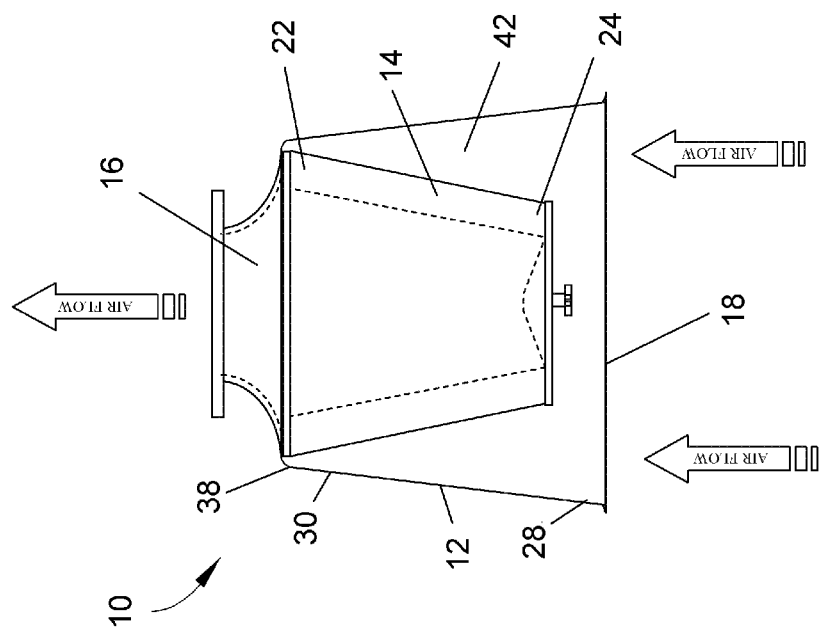
FIG. 6 is a cross-sectional representation of a filtration unit similar to the filtration unit of FIG. 5, but modified to include a silencer section.

FIGS. 5 and 6 depict approaches by which filter units 10 having combinations of frustoconical and/or arcuate-shaped components can be used to mount filters (FIG. 5) and filter silencers (FIG. 6) from, for example, overhanging pipe outlets, such that their outlet pipes 16 are oriented upward and their inlets 18 face downward. A notable difference between the units 10 of FIGS. 5 and 6 and those of FIGS. 1 through 4 is the lack of any flow reversal. Instead of the hood 12 and filter element 14 being assembled so that the open larger end 28 of the hood 12 surrounds the open larger end 22 of the element 14, the open larger end 28 of the hood 12 surrounds the closed smaller end 24 of the element 14, and the smaller end 30 of the hood 12 is closed around the larger end 22 of the element 14. As a result, while the inlet 18 remains located at the larger end 28 of the hood 12, the inlet 18 surrounds and faces the closed smaller end 24 of the element 14, and air flow through the units 10 of FIGS. 5 and 6 is generally axial and unidirectional. Furthermore, because the opposing surfaces of the hood 12 and element 14 are not parallel, the annular-shaped flow passage 42 therebetween is not defined by a substantially constant distance between the hood 12 and element 14, and more rapidly decreases in cross-sectional area as compared to the units of FIGS. 1 through 4. As air will take the path of least resistance, the regions of the filter element 14 that will first load with contaminants will be those most open to the air stream, which in the case of the embodiments of FIGS. 5 and 6 will be adjacent the smaller end 24 of the filter element 14. As a result, loading of the element 14 begins farther upstream from the outlet pipe 16 and progresses upward toward the pipe 16 and the larger end 22 of the element 14. As contaminants load the filter element 14 toward the outlet pipe 16, and a smaller and smaller area of the membrane 36 is available for air flow, the tapering hood 12 begins to accelerate the air, causing an increase in a differential pressure-cancelling static pressure on the contaminated side of the element 14. In this way, the embodiments of FIGS. 5 and 6 also apply the principle of contouring airflow, but with opposing venturi-type shapes to increase velocity as the filter element 14 fills with contaminants, thereby extending the life of the filter element 14, filter function, and filter efficiency. Again, these units 10 are capable of being lighter in weight and handling greater volumes of air than previously available commercial units.

Figure 7:
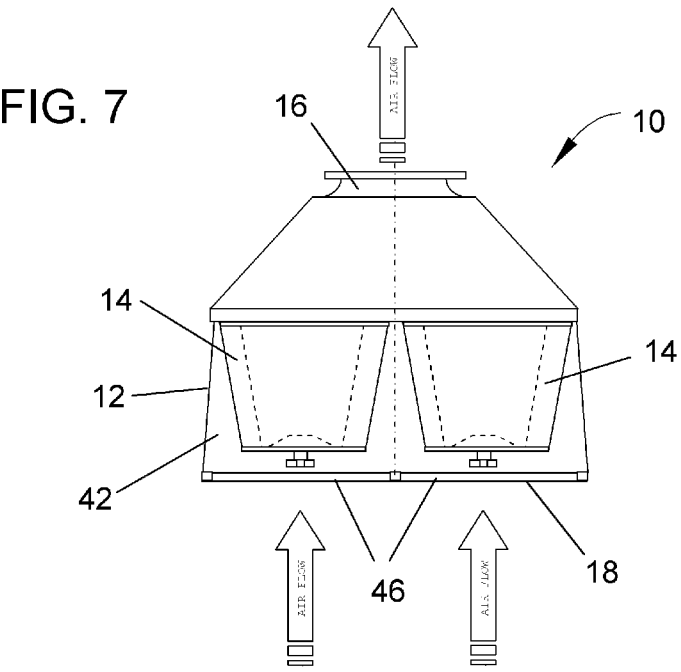
FIGS. 7 and 8 show front and bottom views, respectively, of an I-type inline particulate filtration unit.
Figure 8:
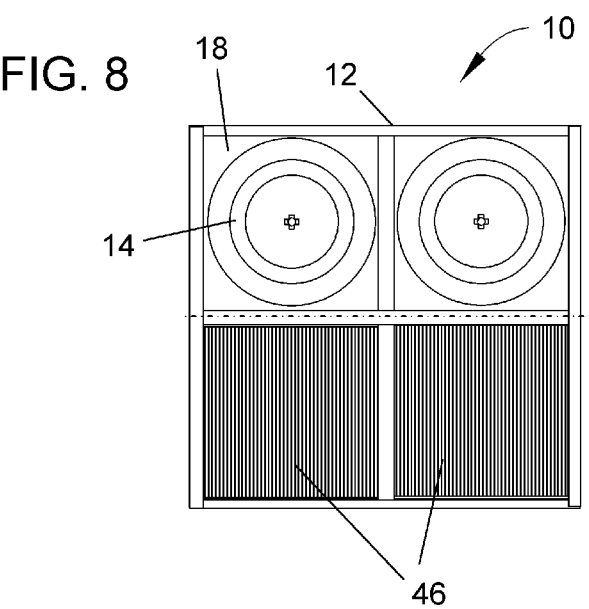
Figure 9:
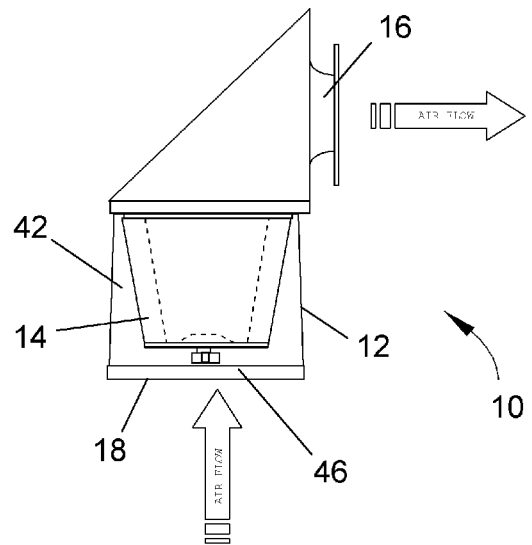
FIGS. 9 and 10 show side and bottom views, respectively, of an L-type inline particulate filtration unit, each with a hood and filter element arrangement of the type shown in FIG. 5, but sharing a common outlet pipe through a manifold.
Figure 10:
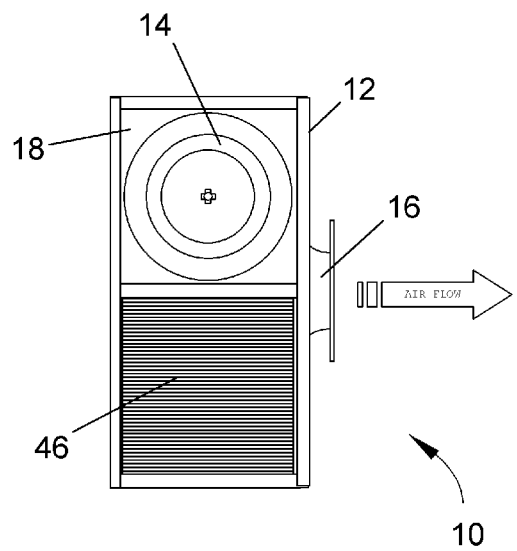

FIGS. 7 and 8 schematically represent front and bottom views, respectively, of an inline filtration unit 10 with an I-type flow-through configuration, and FIGS. 9 and 10 schematically represent side and bottom views, respectively, of an inline filtration unit 10 with an L-type flow-through configuration. In both configurations, multiple hood and element pairs share a common outlet pipe 16 through a manifold 44, and optional prefilters 46 are mounted in the inlets 18 to the hoods 12. In addition, each hood 12 and its filter element 14 are oriented relative to each other as shown in FIGS. 5 and 6, but with the inlets 18 facing downward. In the bottom views of FIGS. 8 and 10, some of the prefilters 44 are removed to provide an end view of their corresponding hood 12 and element 14. The unit 10 of FIGS. 7 and 8 is adapted for mounting with its outlet pipe 16 on top and attached to the machine or air system with which the unit 10 is used, though it could be configured with supports for horizontal mounting as well. The unit 10 of FIGS. 9 and 10 is adapted for mounting with its outlet pipe 16 to one side, such as for attaching to a machine or air system through a wall. The multi-element units 10 of FIGS. 7 through 10 are capable of four to eight times the volume capacity of the units of FIGS. 5 and 6, along with the additional advantage of being capable of utilizing multiple stages of filtration. Their frustoconical filter elements 14 enable these units 10 to be employed in applications normally requiring four to sixteen rectangular panel filter elements of conventional design. With their ability to reduce the amount of material required to handle a given volumetric flow level, the filter units 10 can minimize both weight and cost of the system.

FIGS. 11 and 12 also generally make use of filter units 10 of the type shown in FIGS. 5 and 6 in inline applications with L- and I-type flow-through configurations, respectively. However, the taper of the annular-shaped passages 42 is reduced as a result of the hood 12 being cylindrical-shaped instead of frustoconical-shaped, thus reducing the aerodynamic and operational effects ascribed to the embodiments of FIGS. 5 through 10. While shown as having a horizontal orientation, the unit 10 of FIG. 12 could be adapted for mounting with its outlet pipe 16 on top and attached to the machine or air system with which the unit 10 is used.

While the invention has been described in terms of a preferred embodiment, it is apparent that other forms could be adopted by one skilled in the art. For example, the physical configuration of the filtration system could differ from that shown, and materials other than those noted could be use. Therefore, the scope of the invention is to be limited only by the following claims.

The invention claimed is:

1. A particulate filtration system for filtering particulate matter from a gas, the particulate filtration system comprising a filtration unit having a flow path therethrough, the filtration unit comprising:
   a frustoconical-shaped filtration element comprising a first end, an oppositely-disposed second end larger than the first end, an opening in the second end so as to define a filtration element outlet, means for sealing the first end, a frustoconical-shaped exterior surface, a frustoconical-shaped interior surface radially inward from the exterior surface, and a frustoconical-shaped interior cavity between the first and second ends and surrounded by the interior surface;
   a housing enclosing the filtration element and coaxial therewith, the housing comprising a first end, an oppositely-disposed second end larger than the first end, a frustoconical-shaped wall between the first and second ends of the housing, surrounding the filtration element, and having a frustoconical-shaped interior surface radially outward from the frustoconical-shaped exterior surface of the filtration element, an opening in the second end of the housing, and means for sealing the first end of the housing;
   an annular-shaped passage defined by and between the exterior surface of the filtration element and the interior surface of the housing;
   a filtration unit inlet defined by the opening at the second end of the housing and fluidically connected to the annular-shaped passage; and
   an outlet member at the second end of the filtration element and fluidically connected to the interior cavity of the filtration element, the outlet member defining an outlet passage that is coaxial with the filtration unit inlet and with a shape chosen from the group consisting of frustoconical and arcuate, the outlet passage having a cross-sectional area that decreases along the flow path in a direction away from the filtration element and defining a filtration unit outlet;
   wherein the filtration unit inlet, the annular-shaped passage, the filtration element, the interior cavity of the filtration element, and the outlet passage define the flow path through the filtration unit and are sized and shaped relative to each other to contour flow through the filtration system by decreasing flow velocity through the filtration element so as to reduce face velocity and reduce differential pressure across the filtration element, and by increasing flow velocity between the filtration unit inlet and the filtration element outlet and further increasing flow velocity between the filtration element outlet and the filtration unit outlet.

2. The particulate filtration system according to claim 1, wherein the annular-shaped passage has a cross-sectional area that decreases along the flow path in a direction away from the filtration unit inlet.

3. The particulate filtration system according to claim 2, wherein the annular-shaped passage has a width defined by and between the exterior surface of the filtration element and the interior surface of the housing, and the width is substantially constant throughout the extent of the annular-shaped passage.

4. The particulate filtration system according to claim 2, wherein the annular-shaped passage has a width defined by and between the exterior surface of the filtration element and the interior surface of the housing, and the width decreases along the flow path in a direction away from the filtration unit inlet.

5. The particulate filtration system according to claim 1, wherein the outlet passage has an arcuate shape.

6. The particulate filtration system according to claim 1, wherein the outlet passage has a frustoconical shape.

7. The particulate filtration system according to claim 1, wherein the first end of the housing is adjacent the first end of the filtration element, and the second end of the housing is adjacent the second end of the filtration element.

8. The particulate filtration system according to claim 7, wherein the outlet member is surrounded by the opening in the second end of the housing such that the filtration unit inlet is annular shaped and defined between the second end of the housing and the outlet member.

9. The particulate filtration system according to claim 8, wherein the flow path has a first flow direction through the filtration unit inlet and an opposite flow direction through the filtration unit outlet.

10. The particulate filtration system according to claim 1, wherein the first end of the housing is adjacent the second end of the filtration element, and the second end of the housing is adjacent the first end of the filtration element.

11. The particulate filtration system according to claim 10, wherein the filtration unit outlet and the filtration unit inlet are oppositely disposed.

12. The particulate filtration system according to claim 11, wherein the flow path through the filtration unit inlet and the filtration unit outlet are in the same direction, and the flow path has a radially inward flow direction through the filtration element.

13. The particulate filtration system according to claim 1, wherein the housing further comprises a first arcuate transition region between the second end of the housing and the wall, and a second arcuate transition region between the wall and the first end of the housing.

14. The particulate filtration system according to claim 1, wherein the opening of the housing has a circular cross-sectional area.

15. The particulate filtration system according to claim 1, further comprising a silencing chamber between the interior cavity of the filtration element and the outlet member.

16. A particulate filtration system for filtering particulate matter from a gas, the particulate filtration system comprising a filtration unit having a flow path therethrough, the filtration unit comprising:
   a frustoconical-shaped filtration element comprising a first end, an oppositely-disposed second end larger than the first end, an opening in the second end and so as to define a filtration element outlet having a circular cross-sectional area, means for sealing the first end, a frustoconical-shaped exterior surface, a frustoconical-shaped interior surface radially inward from the exterior surface, and a frustoconical-shaped interior cavity between the first and second ends and surrounded by the interior surface;
   a housing enclosing the filtration element and coaxial therewith, the housing comprising a first end, an oppositely-disposed second end larger than the first end, a frustoconical-shaped wall between the first and second ends of the housing, surrounding the filtration element, and having a frustoconical-shaped interior surface radially outward from the frustoconical-shaped exterior surface of the filtration element, an opening in the second end of the housing defining a filtration unit inlet and having a circular cross-sectional area, and means for sealing the first end of the housing;

an annular-shaped passage defined by and between the exterior surface of the filtration element and the interior surface of the housing and fluidically connected to the filtration unit inlet, the annular-shaped passage having a cross-sectional area that decreases along the flow path in a direction away from the filtration unit inlet; and an outlet member at the second end of the filtration element coaxial and fluidically connected to the interior cavity of the filtration element, the outlet member defining an outlet passage that is coaxial with the filtration unit inlet and with a shape chosen from the group consisting of frustoconical and arcuate, the outlet passage defining a filtration unit outlet and having a circular cross-sectional area that decreases along the flow path in a direction away from the filtration element and toward the filtration unit outlet;

wherein the filtration unit inlet, the annular-shaped passage, the filtration element, and the outlet passage define the flow path through the filtration unit and are sized and shaped relative to each other to contour flow through the filtration system by decreasing flow velocity through the filtration element so as to reduce face velocity and reduce differential pressure across the filtration element, and by increasing flow velocity between the filtration unit inlet and the filtration element outlet and further increasing flow velocity between the filtration element outlet and the filtration unit outlet.

17. The particulate filtration system according to claim 16, wherein:

the first end of the housing is adjacent the first end of the filtration element;

the second end of the housing is adjacent the second end of the filtration element;

the outlet member is surrounded by the filtration unit inlet;

the annular-shaped passage has a width defined by and between the exterior surface of the filtration element and the interior surface of the housing, and the width is substantially constant throughout the extent of the annular-shaped passage; and the flow path has a first flow direction through the filtration unit inlet and, an opposite flow direction through the filtration unit outlet.

18. The particulate filtration system according to claim 16, wherein:

the first end of the housing is adjacent the second end of the filtration element;

the second end of the housing is adjacent the first end of the filtration element;

the filtration unit outlet and the filtration unit inlet are oppositely disposed;

the annular-shaped passage has a width defined by and between the exterior surface of the filtration element and the interior surface of the housing, and the width decreases along the flow path in a direction away from the filtration unit inlet; and the flow path through the filtration unit inlet and the filtration unit outlet are in the same direction, and the flow path has a radially inward flow direction through the filtration element.

19. The particulate filtration system according to claim 16, wherein the housing further comprises a first arcuate transition region between the second end of the housing and the wall, and a second arcuate transition region between the wall and the first end of the housing.

20. The particulate filtration system according to claim 16, further comprising a silencing chamber between the interior cavity of the filtration element and the outlet member.

* * * * *